US006776926B2

(12) United States Patent
Martin

(10) Patent No.: US 6,776,926 B2
(45) Date of Patent: Aug. 17, 2004

(54) CALCIUM HYPOCHLORITE OF REDUCED REACTIVITY

(75) Inventor: Roy Martin, Downers Grove, IL (US)

(73) Assignee: United States Filter Corporation, Palm Desert, CA (US)

( * ) Notice: Subject to any disclaimer, the term of this patent is extended or adjusted under 35 U.S.C. 154(b) by 298 days.

(21) Appl. No.: 09/927,430

(22) Filed: Aug. 9, 2001

(65) Prior Publication Data

US 2003/0038277 A1 Feb. 27, 2003

(51) Int. Cl.[7] .............................. C01B 11/06; C02F 5/10
(52) U.S. Cl. .............................. 252/187.29; 252/187.3; 252/187.28; 252/80; 252/181
(58) Field of Search ...................... 252/187.27, 187.28, 252/187.29, 187.3, 186.36, 186.37, 80, 181

(56) References Cited

U.S. PATENT DOCUMENTS

| | | |
|---|---|---|
| 2,008,684 A | 7/1935 | Craddock |
| 2,212,260 A | 8/1940 | Brothman |
| 2,249,263 A | 7/1941 | Wheelwright, Jr. |
| 2,268,461 A | 12/1941 | Nichols |
| 2,556,014 A | 6/1951 | Tolman |
| 2,651,582 A | 9/1953 | Courtney |
| 2,686,110 A | 8/1954 | Carver |
| 2,740,696 A | 4/1956 | Longwell |
| 3,252,689 A | 5/1966 | Blomgren, Sr. et al. |
| 3,319,937 A | 5/1967 | Wilson et al. |
| 3,389,970 A | 6/1968 | Scheibel |
| 3,536,646 A | 10/1970 | Hatch et al. |
| 3,559,959 A | 2/1971 | Davis et al. |
| T896,051 I4 | 3/1972 | Hamlin et al. |
| 3,702,298 A | 11/1972 | Zsoldos et al. |
| 3,742,735 A | 7/1973 | Verreyne et al. |
| 3,747,899 A | 7/1973 | Latinen et al. |
| 3,756,570 A | 9/1973 | Bühner |
| 3,794,817 A | 2/1974 | Shinskey |
| 3,852,234 A | 12/1974 | Venema |
| 3,965,027 A | 6/1976 | Boffardi et al. |
| 4,016,078 A | 4/1977 | Clark |
| 4,087,360 A | * 5/1978 | Faust et al. ................. 210/701 |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,300,909 A | 11/1981 | Krumhansl |
| 4,433,701 A | 2/1984 | Cox et al. |
| 4,470,907 A | 9/1984 | Seneza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,913,822 A | 4/1990 | Chen et al. |
| 4,965,016 A | 10/1990 | Saitoh et al. |
| 4,977,292 A | 12/1990 | Hwa et al. |
| 5,000,866 A | 3/1991 | Woyciesjes |
| 5,004,549 A | 4/1991 | Wood et al. |
| 5,018,871 A | 5/1991 | Brazelton et al. |
| 5,030,334 A | 7/1991 | Hale |
| 5,061,456 A | 10/1991 | Brazelton et al. |
| 5,112,521 A | 5/1992 | Mullins et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,230,822 A | * 7/1993 | Kamel et al. ................ 510/370 |
| 5,239,257 A | 8/1993 | Muller et al. |
| 5,256,307 A | 10/1993 | Bachhofer et al. |
| 5,262,963 A | 11/1993 | Stana et al. |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |

(List continued on next page.)

FOREIGN PATENT DOCUMENTS

| | | |
|---|---|---|
| DE | 262 139 A3 | 11/1988 |
| DE | 4 312 417 A1 | 10/1994 |
| EP | 0 257 740 | 2/1988 |
| EP | 0 504 621 A1 | 9/1992 |
| FR | 2 672 058 A1 | 7/1992 |
| GB | 2281742 A | 3/1995 |
| JP | 11028479 | 2/1999 |
| LU | 80951 | 2/1979 |
| WO | WO 89/08728 A1 | 9/1989 |
| WO | WO 96/30307 A1 | 10/1996 |
| WO | WO 00/34760 A1 | 6/2000 |
| WO | WO 01/98558 A2 | 12/2001 |

OTHER PUBLICATIONS

Dexter et al., "Use and Limitations of Electrochemical Techniques for Investigating Microbiological Corrosion", Corrosion, 1991, vol. 47, No. 4, pp. 308–318.

(List continued on next page.)

Primary Examiner—Joseph D. Anthony
(74) Attorney, Agent, or Firm—Lowrie, Lando & Anastasi, LLP

(57) ABSTRACT

The present invention is drawn to a solid calcium hypochlorite particle having an available chlorine content of at least about 30% by weight and a water content of from about 2% to about 20% by weight; wherein said solid calcium hypochlorite particle is coated with about 0.01 to about 10% by weight of a deposit control agent comprising a sodium, potassium, lithium, calcium or magnesium salt of at least one of polyepoxysuccinic acid and polymaleic acid.

6 Claims, No Drawings

U.S. PATENT DOCUMENTS

| | | | |
|---|---|---|---|
| 5,332,511 A | | 7/1994 | Gay et al. |
| 5,382,367 A | | 1/1995 | Zinkan et al. |
| 5,422,014 A | | 6/1995 | McLeod et al. |
| 5,424,032 A | | 6/1995 | Christensen et al. |
| 5,489,344 A | | 2/1996 | Martin et al. |
| 5,494,588 A | | 2/1996 | LaZonby et al. |
| 5,518,629 A | * | 5/1996 | Perez et al. ................. 210/698 |
| 5,575,920 A | | 11/1996 | Freese et al. |
| 5,639,476 A | * | 6/1997 | Oshlack et al. ............. 424/468 |
| 5,658,467 A | | 8/1997 | LaZonby et al. |
| 5,683,654 A | | 11/1997 | Dallmier et al. |
| 5,736,097 A | | 4/1998 | Ono |
| 5,770,039 A | | 6/1998 | Rigney et al. |
| 5,783,092 A | | 7/1998 | Lines et al. |
| 5,785,867 A | | 7/1998 | LaZonby et al. |
| 5,800,732 A | | 9/1998 | Coughlin et al. |
| 5,814,233 A | | 9/1998 | Starkey et al. |
| 5,814,247 A | | 9/1998 | Derule et al. |
| 5,820,256 A | | 10/1998 | Morrison |
| 5,849,985 A | | 12/1998 | Tieckelmann et al. |
| 5,855,791 A | | 1/1999 | Hays et al. |
| 5,858,246 A | | 1/1999 | Rafter et al. |
| 5,858,249 A | | 1/1999 | Higby |
| 5,882,526 A | | 3/1999 | Brown et al. |
| 5,888,374 A | | 3/1999 | Pope et al. |
| 5,895,565 A | | 4/1999 | Steininger et al. |
| 5,902,751 A | | 5/1999 | Godec et al. |
| 5,947,596 A | | 9/1999 | Dowd |
| 5,972,196 A | | 10/1999 | Murphy et al. |
| 5,980,758 A | | 11/1999 | LaZonby et al. |
| 5,985,155 A | | 11/1999 | Maitland |
| 6,015,484 A | | 1/2000 | Martinchek et al. |
| 6,030,842 A | | 2/2000 | Peachey-Stoner |
| 6,045,706 A | | 4/2000 | Morrison et al. |
| 6,068,012 A | | 5/2000 | Beardwood et al. |
| 6,106,770 A | | 8/2000 | Ohki et al. |
| 6,120,619 A | | 9/2000 | Goudiakas et al. |
| 6,120,698 A | | 9/2000 | Rounds et al. |
| 6,132,593 A | | 10/2000 | Tan |
| 6,143,184 A | | 11/2000 | Martin et al. |
| 6,146,538 A | * | 11/2000 | Martin ....................... 210/698 |
| 6,149,819 A | | 11/2000 | Martin et al. |
| 6,159,552 A | | 12/2000 | Riman et al. |
| 6,238,555 B1 | | 5/2001 | Silveri et al. |
| 6,284,144 B1 | | 9/2001 | Itzhak |
| 6,315,950 B1 | | 11/2001 | Harp et al. |
| 6,409,926 B1 | | 6/2002 | Martin |
| 6,419,817 B1 | | 7/2002 | Martin |
| 6,423,234 B1 | | 7/2002 | Martin |
| 2002/0043650 A1 | | 4/2002 | Martin |
| 2002/0152036 A1 | | 10/2002 | Martin |

OTHER PUBLICATIONS

Gusmano et al., "Electrochemical Noise Resistance as a Tool for Corrosion Rate Prediction", Corrosion, 1997, vol. 53, No. 11, pp. 860–868.

U.S. Filter/Stranco, "Strantrol System 4 Pool & Spa Chemistry Controller," 2000.

U.S. Filter/Stranco, "Strantrol System5F Pool & Spa Chemistry Controller," 2000.

U.S. Filter/Stranco, "Strantrol System6 Pool Chemistry & Filter Backwash Controller," 2000.

U.S. Filter/Stranco, "Strantrol System7 Mechanical Room Controller for Aquatic Facilities," 2000.

Kloberdanz, B., "The Air in There: Enhancing an Indoor Pool Environment," Recreation Management, 2000.

Selvick, E., "Take Control of 'Yo–Yo' Treatment Cycles," International Aquatics, National Trade Publications, Inc., Jul./Aug. 1997.

Frazier, B., "Automation to the Rescue," Aquatics International, May/Jun. 1998.

Batt, T. et al., "The Water Down Under," Parks & Recreation, Nov. 1999.

Krone, D., "Automated Water Chemistry Control at University of Virginia Pools," Facilities Manager, vol. 13, No. 6, Nov./Dec. 1997.

U.S. Filter/Stranco, "Remote Monitoring for Unstaffed Pools," Parks & Recreation, Nov. 1997.

Minton, E., "On the Waterpark," Swimming Pool/Spa Age (date unknown).

U.S. Filter/Stranco, "Environmental Control at Indoor Pool: New ECS System Eliminates Chronic Air Quality Woes For New York School District Pool," Stranco Products Capsule Case History #806, Jul. 1998.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environmental Control at Indoor Pool: ECS System Optimizes Air & Water Quality at Texas School District Swim Center," Stranco Products Capsule Case History #811, Nov. 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Air & Water Quality Control for Indoor Aquatic Facilities," U.S. Filter Corporation, 1998.

U.S. Filter/Stranco, "Strantol ECS—Environmental Control System (For Pool)," 2000.

U.S. Filter/Stranco, "Abstracts of Strancol ECS Case Histories," (date unknown).

Williams, K., "Aquatic Facility Operator Manual," National Recreation and Park Association, Second Edition, 1995.

Normenausschusse Wasserwesen, "Treatment and disinfection of water used in bathing facilities,"DIN 19643–4, Feb. 1999.

Normenausschusse Wasserwesen, "Treatment and disinfection of water used in bathing facilities,"DIN 19643–3, Apr. 1997.

Normenausschusse Wasserwesen, "Treatment and disinfection of water used in bathing facilities," DIN 19643–2, Apr. 1997.

Normenausschusse Wasserwesen, "Treatment and disinfection of water used in bathing facilities," DIN 19643–1, Apr. 1997.

STRANCO, "The Best of Poolfax," The Poolfax Newsletter, 1981–1984.

Victorin et al., "Redox potential measurements for determining the disinfecting power of chlorinated water," *J. Hyg., Camb.*, 70, 1972, pp. 313–323.

U.S. Filter/Stranco, "Environmental Control System Training Meeting, Mar. 15, 2000".

Kim, Yong H., "Evaluation of Redox Potential and Chlorine Residual as a Measure of Water Disinfection," presented at the 54th International Water Conference, Pittsburgh, PA, Oct. 11–13, 1993.

Scully et al., Disinfection Interference in Wastewaters by Natural Organic Nitrogen Compounds, *Environ. Sci. Techn.*, vol. 30, No. 5, 1996, pp. 1465–1471.

White, Geor. Clifford, Handbook of Chlorination and Alternative Disinfectants, Third Edition, (date unknown), pp. 801, 803–809, 922–924.

Carlson, S., "Fundamentals of water disinfection," *J Water SRT—Aqua*, vol. 40, No. 6, (1991), pp. 346–356.

Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer–Verlag, (1961), pp. 100–110.

Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer–Verlag, (1961), pp. 330–342.

Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer–Verlag, (1963), pp. 1–13.

Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Spring–Verlag, (1963), pp. 1–18.

STRANCO, "Solutions: Effluent Dechlorination", Stranco Product Literature (date unknown).

Hensley, R. et al., "Disinfection Metamorphosis: From Chemicals to Control," *Operations Forum*, vol. 12, No. 4, Apr. 1995.

Hetzler, J.T. et al., "ORP: A Key to Nutrient Removal," *Operations Forum*, vol. 12, No. 2, Feb. 1995.

Bossard, G. et al., "Optimizing Chlorination/Dechlorination at a Wastewater Treatment Plant," reprinted from *Public Works*, Jan. 1995.

Eddington, Gordon, "Successfully Managing Wastewater Chlorination," Stranco Product Literature (date unknown).

Ryan, D. et al., "Waste Not, Want Not: Avoiding Chemical Excesses," reprinted from *Operations Forum*, vol. 11, No. 4, Apr. 1994.

D'Adam, D. et al., "A Case Study of Wastewater Plant Disinfection," reprinted from *Public Works Magazine*, Nov., 1994.

"Louisiana Plant Uses New Technology for Dechlorination," reprinted from *American City & County*, Feb. 1994.

Kiser, P. et al., "ORP or Residual: Which Measures Oxidation?" Sep. 10, 1992, pp. 1–7.

"Acu–Trol Programmable Controllers," Product Literature from www.acu–trol.com, printed Nov. 19, 1999.

Santa Barbara Control Systems, "Chemtrol™ PC Programmable Controllers: Integrated Water Treatment with Remote Control," Product Literature, (date unknown).

"Chemtrol Automatic Pool Controllers," Product Literature from www.sbcontrol.com, printed Nov. 19, 1999.

"Chemtrol—PC6000 Controller," Product Literature from www.sbcontrol.com, printed Nov.19, 1999.

"Chemtrol—PC3000 Controller," Product Literature from www. sbcontrol.com, printed Nov. 19, 1999.

"AK100 Swimming Pool Control Systems," Product Literature from www.acu–trol.com, printed Nov. 19, 1999.

Acu–Trol, "AK100 Series" Product Literature (date unknown).

Acu–Trol, "Acu–Trol Programmable Controllers: AK100 Series and AK200," Product Literature (date unknown).

Aquasol Controllers, Inc., "Aquasol WTC," Product Literature, (date unknown).

Aquasol Controllers, Inc., "What is a Controller?" Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol Controllers, Inc., "Aquasol SPC Specifications," Product Literature from www.aquasol.com, printed Nov. 19, 1999.

Acu–Trol, "AK100 Summary," Product Literature from www.acu–trol.com, printed Nov. 19, 1999.

CAT Controllers, "CAT 2000+Programmable Water Chemistry Controller," Product Literature (date unknown).

Rola–Chem Corporation, "The New Wave in Water Management: Take Control with Rola–Chem," Product Catalog, Apr. 1999.

Strand, R. et al., "ORP As a Measure of Evaluating and Controlling Disinfection in Potable Water," (Source and date unknown).

Mansfeld et al., "Electrochemical Noise Analysis of Iron Exposed to NaCl Solutions of Different Corrosivity," *J. Electrochem. Soc.*, vol. 141, No. 5, May 1994, pp. 1402–1404.

Brusamarello et al., "Analysis of Different Methods to Calculate Electrochemical Noise Resistance Using a Three-Electrode Cell," *Corrosion*, vol. 56, No. 3, Mar., 2000, pp. 273–282.

Kim, Yong H., "On the Activation of Polymeric Flocculants," AIChE Annual Spring Meeting, Houston, TX, Apr. 2–6, 1989.

U.S. Filter/Stranco, "Total Dissolved Solids, Friend or Foe?", Aquatic Technology Newsletter, vol. 1, No. 2, 1988; pp. 1–7.

U.S. Filter/Stranco, "The Relationship of ORP to PPM and Its Automated Control," Aquatic Technology Newsletter, vol. 1, No. 3, 1999, pp. 1–5.

U.S. Filter/Stranco, "The Chemistry and Control of Chloramines," Aquatic Technology Newsletter, vol. 1, No. 4, 1999, pp. 1–5.

U.S. Filter/Stranco, "Why Do I Have Algae In My Pool?" Aquatic Technology Newsletter, vol. 1, No. 6, 1999, pp. 1–2.

Carpenter, Colleen et al., "Chlorine Disinfection of Recreational Water for *Cryptosporidium parvum,*" *Emerging Infectious Diseases*, vol. 5, No. 4, Jul.–Aug. 1999, pp. 579–584.

U.S. Filter/Stranco, "ECS–Pool (w/CHF–150) Engineering Packet," Apr. 22, 1999.

Kowalsky, L., "Pool–Spa Operators Handbook," National Swimming Pool Foundation, 1983–1990.

Lynntech, Inc., "Electrochemical Ozone Generator," Model 124 Product Literature (date unknown).

U.S. Filter/Stranco, "Strantrol Automated Water Chemistry Control for Commercial Pools," 1998.

U.S. Filter/Stranco, "Strantrol System 3 Pool & Spa Chemistry Controller," 2000.

* cited by examiner

CALCIUM HYPOCHLORITE OF REDUCED REACTIVITY

FIELD OF THE INVENTION

This invention relates to calcium hypochlorite blends; particularly to blends of solid calcium hypochlorite in combination with an alkali salt form(s) of anti-scaling polymers, wherein the polymer(s) are present in an alkali salt form effective at reducing the hygroscopic characteristics of the solid polymer(s), and subsequent calcium hypochlorite blend. This invention also relates to a means of reducing the reactivity of solid calcium hypochlorite with the said polymer(s) by applying a coating of the polymer(s) to the solid calcium hypochlorite.

BACKGROUND OF THE INVENTION

U.S. Pat. Nos. 5,112,521 and 5,004,549 disclose the blending of Phosphono-Butane-Tricarboxylic acid (PBTC) with calcium hypochlorite to produce a solid calcium hypochlorite blend that inhibits scale formation associated with the reconstitution and dispensing of the calcium hypochlorite solution.

U.S. Pat. No. 6,146,538, the contents of which are herein incorporated by reference, discloses the use of Polymaleic acid (PMA) and/or Polyepoxysuccinic acid (PESA) in an alkali salt form that is blended with calcium hypochlorite to reduce or eliminate scale formation associated with the reconstitution and dispensing of the calcium hypochlorite solution.

It is known that increased moisture, especially localized moisture, increases the rate of decomposition of calcium hypochlorite. During decomposition, oxygen is released, with chlorides and chlorates typically being the resulting byproducts. In the presence of sufficient moisture, exothermic reactions result, oxygen release increases, and a potential fire hazard is produced when fuel sources are available, e.g. cloth, hydrocarbons and the like.

PBTC disclosed in U.S. Pat. Nos. 5,112,521 and 5,004,549, when combined with calcium hypochlorite as an anti-scaling agent, can nevertheless compromise manufacturing safety and solid product stability, due to its inherent hygroscopic characteristics.

It has now been discovered that the alkali salt forms of PMA, PESA, and similar polymeric salts which are commonly employed as deposit control agents, can significantly reducing the hygroscopic characteristics of calcium hypochlorite when combined therewith, in addition to providing enhanced anti-scaling properties. It has been further discovered that a coating of these polymers or blends thereof significantly reduces the reactivity of the solid calcium hypochlorite blend.

Thus, a step forward in the art is realized via provision of a solid calcium hypochlorite combination which simultaneously exhibits anti-scaling properties and reduced hygroscopic and reactivity characteristics. Such a composition yields improvements in both manufacturing safety and product stability by reducing moisture adsorption and subsequent decomposition of the calcium hypochlorite, as well as improved safety by reducing the reactivity of the solid calcium hypochlorite.

DESCRIPTION OF THE PRIOR ART

U.S. Pat. No. 4,146,676 describes calcium hypochlorite particles coated with about 4 to 45 percent by weight of a low melting inorganic salt, e.g. aluminum sulfate hydrates, to reduce dusting during handling and to increase stability of calcium hypochlorite contacted with lighted cigarettes or reactive organic materials such as glycerine.

U.S. Pat. No. 4,965,016 describes a granular calcium hypochlorite composition comprising a particle of calcium hypochlorite, the surface of which has been covered with a double decomposition product of calcium hypochlorite and an alkali metal hydroxide. It was shown the granular strength and stability was enhanced.

None of the prior art describes addition of an alkali salt of an organic polymeric anti-scaling agent to provide improved deposit control, while reducing the stability and reactivity of the solid calcium hypochlorite.

SUMMARY OF THE INVENTION

The instant invention is directed toward a solid calcium hypochlorite product formulation and a method for its production, which product exhibits improved environmental stability and shelf-life while simultaneously inhibiting scale in dispensing equipment, as well as in and on feed equipment used for delivering a calcium hypochlorite solution to a water stream which is to be treated.

A solid calcium hypochlorite composition with improved hygroscopic and reactivity characteristics is formulated comprising hydrated calcium hypochlorite and an alkali salt of Polymaleic acid, Polyepoxysuccinic acid or mixtures thereof, having between 0.01 and 10% by weight of said alkali salts, an available chlorine concentration of at least 30% and water in the range of about 2% to about 20% by weight.

In a particularly preferred embodiment, the composition is a solid having greater than about 50% active Calcium Hypochlorite which exhibits anti-scaling characteristics and reduced hygroscopicity and reactivity.

The solid calcium hypochlorite may be coated and/or encapsulated with at least one polymeric alkali salt selected from within the group including polymaleate, polyacrylate, polyacrylamide, polycarboxylate, polymethacrylate, Phosphinopolycarboxylate, Carboxylate-Sulfonate copolymer, Maleic Anhydride copolymer, Polyepoxysuccinate, maleate-sulfonate copolymer, maleate-phosphonate copolymer, carboxylate-phosphonate copolymer, and/or mixtures thereof.

The alkali salt may be selected from at least one of the group including the sodium, potassium, lithium, calcium, or magnesium salts and mixtures thereof. Additionally, the polymeric alkali salt may be in a liquid, slurry, or solid form.

At some point in the manufacturing process the calcium hypochlorite may be formulated/treated with a deposit control agent including at least one alkali salt(s), e.g. sodium, potassium, lithium, calcium, magnesium and/or mixtures thereof, of polymaleic acid, polyexpoxysuccinic acid, maleic anhydride copolymer, phosphinopolycarboxylic acid, carboxylic-sulfonic acid copolymer, maleic-sulfonic acid copolymer, maleic-phosphonic acid copolymer, carboxylic-phosphonic acid copolymer, and/or mixtures thereof. The weight percent of deposit control agent is within the range of about 0.01% to about 10% of the final weight of the formulated calcium hypochlorite product.

These polymers and copolymers will exhibit similar hygroscopic characteristics in the desired salt forms while providing deposit control capability. Furthermore, all are hydrophilic and possess high thermal stability. Therefore they will reduce reactivity of the solid calcium hypochlorite product.

Accordingly, it is an objective of the instant invention to provide a solid calcium hypochlorite product and a method for its production, wherein the resultant product exhibits reduced hygroscopic characteristics thereby improving the manufacturing safety and shelf-life and anti-scaling properties of the solid product.

It is a further objective of the instant invention to provide a coated or encapsulated solid calcium hypochlorite product having reduced reactivity and anti-scaling properties.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

As illustrated in Table 1, embodiments disclosed in U.S. Pat. Nos. 5,112,521 and 5,004,549 as well as an alkali salt form of the Polymaleic acid disclosed in U.S. Pat. No. 6,146,538 (all of which are herein incorporated by reference) were tested for their hygroscopic properties by exposing similar quantities of each to a controlled atmospheric environment consisting of the following approximate conditions:

72° F., and 50% humidity.

The samples were weighed and then exposed to the controlled environment. The samples were weighed before and after exposure. The increase in weight is associated with the increased moisture.

The NaPBTC increased moisture through adsorbing moisture from the surrounding environment.

It is understood that based upon the known reactivity of calcium hypochlorite, which is a Class 3 oxidizer, and its known increased decomposition with increased moisture, that the addition of an anti-scaling agent that increases hygroscopicity will lead to a potentially dangerous situation. Thus, the instant invention provides a combination of ingredients which simultaneously reduces the hygroscopic characteristics of the final solid product, thereby improving the manufacturing safety and final product stability, while ensuring chemical feed reliability through improved deposit control.

TABLE 1

|  | Weight before | Weight After 2 hr | w/w % Change 2 hr |
| --- | --- | --- | --- |
| Dry Polymaleate Polymer | 0.99 grams | 1.01 grams | 2.02% |
| BAYHIBIT (PBTC) | 1.09 grams | 1.27 grams | 16.51% |
|  |  | Weight After 24 hr | w/w % Change 24 hr |
| Dry Polymaleate Polymer |  | 1.06 grams | 7.07% |
| BAYHIBIT (PBTC) |  | 1.93 grams | 77.06% |

Adsorption of localized moisture creates the greatest concern. While the % weight increase to a 1.5% blend would appear to be minimal, localized moisture increase will correlate to the data exemplified in Table 1, reducing shelf life, chlorine activity, and potential increased risk of combustion when fuel sources are contacted as outlined in Table 2, below.

While not wishing to be bound to any particular physical form, the combination of calcium hypochlorite and polymer may be in the form of a homogeneous mixture, may alternatively take the form of an outer layer or covering which coats or encapsulates the cal-hypo for increased stability and reduced reactivity, or a combination thereof.

Table 2 illustrates the reaction of 68% calcium hypochlorite shock, sold under the brand name HTH SHOCK, with and without a coating of a calcium polymaleate salt, upon exposure to oil.

Each sample used approximately 7.5 grams of solid calcium hypochlorite. The treated sample was mixed with 4.7 grams of polymer salt (slurry weight), followed by convective drying. Each sample was placed in a dish where 1 oz. of oil (brake fluid) was added as a fuel source.

The results clearly illustrate that coating the solid calcium hypochlorite with a polymeric salt(s) of Polymaleic acid or PESA as described in U.S. Pat. No. 6,146,538 dramatically reduces the reactivity of calcium hypochlorite. Even in the case of extended exposure to combustible materials, the formulation described has the ability to significantly reduce the rate of decomposition of the calcium hypochlorite and prevent ignition when ignition would otherwise occur without treatment. It is therefore also reasonable to extrapolate from the data that further improvement would be achieved by encapsulation of the solid calcium hypochlorite.

TABLE 2

|  | Time to Fuming | Time to Combustion | Residue |
| --- | --- | --- | --- |
| HTH Shock | 58 seconds | 62 seconds | Charred, light weight, ash like residue |
| Treated HTH Shock | 525 seconds | Not Applicable | No charred, heavy, polymer cal-hypo mix |

Additional tests were performed using various polymeric salts with known anti-scaling abilities. These polymers all possess thermal stability sufficient to prevent their decomposition during exposure to exothermic reactions from the decomposition of exposed calcium hypochlorite as well as hot fuming fuels. The thermal stability ensures the polymer coating prevents exposure of coated calcium hypochlorite thereby preventing a self-sustaining decomposition or runaway reaction.

Salt samples of polyacrylate and polymaleate were produced for reactivity testing as illustrated in Table 3.

TABLE 3

| Sample | Polymer Salt Form | Grams 68% Cal-Hypo | Grams Polymer (solids) |
| --- | --- | --- | --- |
| 1 | Na/Ca Polyacrylate | 45 | Approx. 2 |
| 2 | Ca Polyacrylate | 45 | Approx. 2 |
| 3 | Na/Ca Polymaleate | 45 | Approx. 2 |

These polymer salt samples were applied in either the form of a slurry or foam to 45 gram samples of >68% calcium hypochlorite sold under the brand name HTH. Foam (table 4 sample 3b) was used to enhance the distribution of the polymer. After drying, the treated samples were compared to blank samples for reactivity. 10 ml of brake oil fluid was used as a fuel source, and the time from addition to fuming and ignition was measured, along with their weights.

Table 4 illustrates the results of the testing.

TABLE 4

| Sample | Cal-hypo wt. (gm) | Total wt. (gm) | Fuming (sec) | Ignition (sec) | Final Weight (gm) | Appearance | Polymer applied |
|---|---|---|---|---|---|---|---|
| Untreated | | | | | | | |
| 1 | 7.72 | 9.99 | spilled | n/a | n/a | n/a | n/a |
| 2 | 7.84 | 10.02 | 12 | 14 | 10.13 | Charred Ash | n/a |
| 3 | 7.81 | 9.99 | 13 | 15 | 9.74 | Charred Ash | n/a |
| 4 | 7.86 | 10.03 | 13 | 15 | 9.37 | Charred Ash | n/a |
| Treated | | | | | | | |
| | 7.88 | 9.95 | 100 | N/A | 15.97 | Cal-hypo residue | Slurry |
| | 7.77 | 10.03 | 105 | N/A | 16.8 | Cal-hypo residue | Slurry |
| | 7.89 | 9.99 | 45 | N/A | 14.67 | Cal-hypo residue | Slurry |
| | 7.88 | 9.92 | 195 | N/A | 18.83 | Cal-hypo residue | Foam |

The results of these test illustrate that treating the >68% calcium hypochlorite with an alkali salt form of hydrophilic polymer with thermal stability exceeding 300° F. significantly reduces the reactivity of the calcium hypochlorite.

The reaction is self-limiting in that only exposed (untreated) calcium hypochlorite is involved in the reaction and once consumed in the reaction, residual fuel remains in contact with the stabilized (treated) calcium hypochlorite.

These test results further illustrate that by limiting exposure of calcium hypochlorite to the fuel source, the rate of reaction is significantly reduced, and ignition is avoided all together.

Yet another result of these tests is that increased coverage of the calcium hypochlorite yields further reduction in reactivity of the treated calcium hypochlorite. In this example, application of the polymer by use of an expanded foam to increase its volume improved coverage and distribution, correlating to improved performance at reducing the samples reactivity.

As previously presented, improving the hygroscopic characteristics of the calcium hypochlorite improves the manufacturing safety and shelf-life of the solid product. This is true regardless of whether the solid product is in a granular, pellet, tablet or briquette form. By adding an anti-scaling agent with improved hygroscopic characteristics, the potential for compromising safety and shelf-life is reduced.

By reducing the surface area of the calcium hypochlorite by coating the solid material with a hydrophilic polymeric salt with thermal stability exceeding 300° F., the reactivity of the calcium hypochlorite is reduced, while allowing rapid dissolution of the calcium hypochlorite when diluted with water, as in the case of a calcium hypochlorite dispenser.

To further improve the hygroscopic characteristics of the hydrophilic salt, divalent salts, or increased percentages thereof, should be included in the final salt form of the polymer.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. The compounds, compositions, and any biologically related compounds, methods, procedures and techniques described herein are presently representative of the preferred embodiments, are intended to be exemplary, and are not intended as limitations on the scope. Changes therein and other uses will occur to those skilled in the art, which are encompassed within the spirit of the invention and are defined by the scope of the appended claims.

Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A solid calcium hypochlorite particle having an available chlorine content of at least about 30% by weight and a water content of from about 2% to about 20% by weight; wherein said solid calcium hypochlorite particle is coated with about 0.01 to about 10% by weight of a deposit control agent comprising a sodium, potassium, lithium, calcium or magnesium salt of at least one of polyepoxysuccinic acid and polymaleic acid.

2. The calcium hypochlorite particle of claim 1, wherein the metal is calcium.

3. The solid calcium hypochlorite particle according to claim 1 wherein the deposit control agent comprises a sodium, potassium, lithium, calcium or magnesium salt of polyepoxysuccinic acid.

4. A solid calcium hypochlorite particle having an available chlorine content of at least about 30% by weight and a water content of from about 2% to about 20% by weight; wherein said solid calcium hypochlorite particle is coated with about 0.01 to about 10% by weight of a deposit control agent consisting essentially of a sodium, potassium, lithium, calcium or magnesium salt of at least one of polyepoxysuccinic acid and polymaleic acid.

5. The calcium hypochlorite particle of claim 4, wherein the metal is calcium.

6. The solid calcium hypochlorite particle according to claim 4 wherein the deposit control agent consists essentially of a sodium, potassium, lithium, calcium or magnesium salt of polyepoxysuccinic acid.

* * * * *